Dec. 15, 1970    KAKUICHIRO HOSOKOSHI    3,547,675
COLOR PICTURE TUBE
Filed July 3, 1967
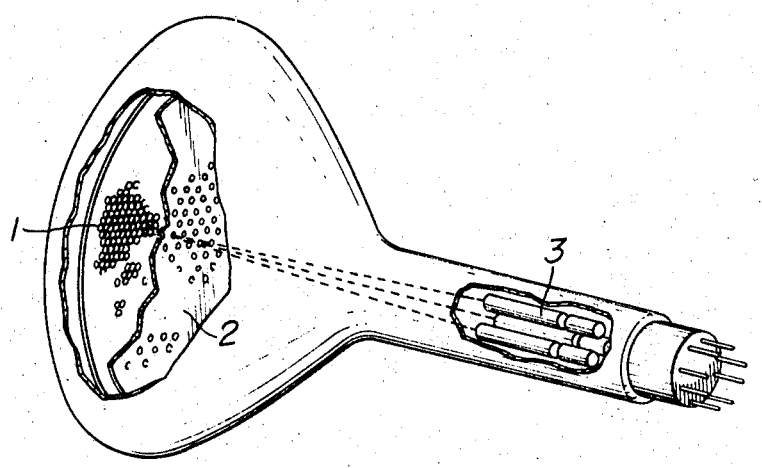

3,547,675
COLOR PICTURE TUBE
Kakuichiro Hosokoshi, Kyoto, Japan, assignor to Matsushita Electronics Corporation, Osaka, Japan, a corporation of Japan
Filed July 3, 1967, Ser. No. 650,843
Claims priority, application Japan, July 5, 1966, 41/44,321
Int. Cl. H01j *31/20*
U.S. Cl. 117—33.5                                      4 Claims

ABSTRACT OF THE DISCLOSURE

An oxide phosphor consisting of $Y_2O_3$:Eu phosphor or $Gd_2O_3$:Eu phosphor as a red phosphor material is used in a color picture tube of the present invention. To meet the high radiation intensity of the said new oxide phosphor study has been made to obtain the white color in the screen by defining ratios $I_R/I_G$ and $I_R/I_B$ as to be $1.2\pm0.3$ and $1.5\pm0.5$ respectively. The present color picture tube can produce radiations greater by 40% in brightness than the conventional color picture tubes and is interchangeable with conventional one.

---

The present invention relates to improvements in a color picture tube using an oxide phosphor consisting of $Y_2O_3$:Eu phosphor or $Gd_2O_3$:Eu phosphor as a red phosphor material.

In general, in the conventional color picture tubes, the fluorescent film has been composed of (ZnCd)S:Ag phosphor as red phosphor, ZnS:Ag phosphor as blue phosphor, and (ZnCd)S:Ag phosphor as green phosphor, respectively. These sulfide phosphors being irradiated by the excitation of electron beam emit each specific light such as red, blue and green. As the red phosphor is especially low in radiation efficiency, the radiation intensity of the phosphors for the same exciting current is different from one another. Therefore, in order to obtain white color at about 9,300° K. by mixing red, blue and green, the ratios of the exciting currents have usually been established by such conditions as, $$I_R/I_G = 1.40 \pm 0.55$$
$$I_R/I_B = 1.50 \pm 0.70$$

For each color, the radiation intensity of phosphor is approximately proportional to the magnitude of the exciting current. In said equations, $I_R$ represents the exciting current for the red phosphor, $I_G$ represents the exciting current for the green phosphor and $I_B$ represents the exciting current for the blue phosphor.

On the other hand, in order to improve the brightness of the fluorescent film in the color picture tube, it is considered advantageous to concentrate the main force to the improvement of red phosphor strongly contributing to the brightness of white color radiation, and therefore $Y_2O_3$:Eu phosphor and $Gd_2O_3$:Eu phosphor have recently been developed as red phosphor materials. By using either of said oxide phosphors, the radiation intensity of red color can be improved by about 40% in comparison with the conventional phosphors. However, in case of using said oxide phosphor as a red phosphor material, the hue is somewhat varied simultaneously with the increase of red radiation intensity. Consequently, as long as the conventional materials for blue and green phosphors are employed, it is necessary to establish the ratios of the exciting currents by three electron guns such as, $$I_R/I_G = 0.65 \pm 0.25$$
$$I_R/I_B = 0.75 \pm 0.35$$

and to thereby obtain the balance in white color.

Therefore, actually in spite of the fact that the radiation intensity of the red phosphor itself is increased by about 40%, such color picture tubes as the above merely make about 40% increase of the total radiation intensity. As the above color picture tube has different characteristics from that of the conventional color picture tube using the sulfide phosphor as a red phosphor, the balance in white color becomes out of order in case of mounting said color picture tube as it is in the television receivers designed for the conventional color picture tube. That is, there is a serious drawback that this tube has no interchangeability at all with the conventional color picture tubes.

The present invention relates to a color picture tube prepared by removing such conventional drawbacks as the above.

The present invention will be fully understood from the following detailed description referring to the accompanying drawing in which is shown a color picture tube in a perspective view embodying the present invention.

In the drawing, reference numeral 1 represents a phosphor screen made of three kinds of phosphor materials to be excited by electron beams from three electron guns 3 positioned at the opposite end of the tube. A shadow mask 2 is located between the phosphor screen 1 and the electron guns 3. The three kinds of phosphor materials are for emitting red, green and blue lights upon impingement of electrons emitted from the three electron guns 3.

In the color picture tube of the present invention shown in the drawing, an oxide phosphor consisting of $Y_2O_3$:Eu phosphor or $Gd_2O_3$:Eu phosphor is used as a red phosphor material, while as blue and green phosphor materials are used sulfide phosphors of different characteristics with increased radiation intensities. As for the ratio of the exciting current for obtaining white color at about 9,300° K., the central value of $I_R/I_G$ established to be about 1.2 and the central value of $I_R/I_B$ about 1.5.

The ordinary brightness increasing treatment for increasing the radiation intensity of a blue phosphor material is to remove or reduce a substance of controlling the radiation intensity, cobalt, iron, nickel or the like which is so-called a killer substance usually added, in the amount of from $10^{-4}$–$10^{-3}$% by weight, to ZnS:Ag phosphor used as a blue phosphor material. By this treatment, however, an increase of only 25% at most in the radiation intensity of the blue phosphor material can be obtained. Further, ammonium bichromate which is contained in a sensitizer essential in the formation of fluorescent film is a factor lowering the radiation intensity of the blue phosphor, and therefore the present inventor has covered the particle surface of ZnS:Ag phosphor with an acidic oxide such as a mixture of $GeO_2+SiO_2$, a mixture of $WO_3+SiO_2$ or the like. The acidic oxide covering is formed by stirring sintered but untreated phosphor particles in a dispersing liquid consisting of, for example, water glass containing a mixture of $GeO_2+SiO_2$ or a mixture of $WO_3+SiO_2$, so that the oxide material may be deposited on the surfaces of the phosphor particles and then subjecting the particles thus treated to drying and heat-treatment. The percentage of the acidic oxide covering in the so covered particles may be 0.05–0.5% by weight. By the above covering, the absorption of chrome is reduced and about 15% increase in the radiation intensity of the blue phosphor material can be obtained thereby. Furthermore, in case of employing said treatment together with this covering method, about 45% increase in the radiation intensity of the blue phosphor can be obtained as compared with the conventional cases.

As for green phosphor, about 20% increase in the radiation intensity of the green phosphor can be obtained by transferring the hue to one of a higher visibility within an extent that no ill effect is exerted on the color purity. This transference of the hue is possible by adjusting the ratio of Zn to Cd in (ZnCd)S:Ag. This ratio is conventionally 66:34. For the purpose of such transference of the hue, the conventional ratio is changed to, for example, 63:37. Further, in case of covering the particle surface of (ZnCd)S:Ag phosphor with an acidic oxide, such as a mixture of $GeO_2+SiO_2$, a mixture of $$WO_3+SiO_2$$

or the like, about 20% increase in the radiation intensity of the green phosphor can be obtained. The percentage of the acidic oxide covering in the so covered particles may be 0.05–0.5% by weight as in the case of the blue phosphor material above described. Moreover, by adding this method to said transferring technique, about 45% increase can be obtained in the radiation intensity of the green phosphor. The covering is made as described above in the case of the blue phosphor material.

In the case of an oxide phosphor consisting of $Y_2O_3$:Eu phosphor or $Gd_2O_3$:Eu phosphor being used as a red phosphor material and even sulfide phosphors being used respectively as blue and green phosphor materials, about 45% increase in the radiation intensity of each of these sulfide phosphors can be made by covering the surfaces of said phosphor particles with an acidic oxide such as germanium oxide or the like for reducing the absorption of chrome and by applying the additional means such as reduction of said killer substance from the blue phosphor or adjustment of content ratio of Zn and Cd in the green phosphor. Thereby, it is made possible that the ratios of the exciting currents in the case of obtaining the white color at about 9,300° K. that is, $I_R/I_G$ is $1.2\pm0.3$ and $I_R/I_B$ is $1.5\pm0.5$. Thus, the color picture tube according to the present invention can produce the radiation greater by 40% in brightness than the conventional color picture tubes using the sulfide phosphor as a red phosphor material and further is interchangeable with the conventional ones.

What is claimed is:

1. A color picture tube with a phosphor screen comprising a red emitting oxide phosphor material selected from the group consisting of $Y_2O_3$:Eu and $Gd_2O_3$:Eu, a green emitting (ZnCd)S phosphor material and a blue emitting ZnS phosphor material, wherein particles of at least one of said sulfide phosphor materials are covered with an acidic oxide material selected from the group consisting of a mixture of $GeO_2$ and $SiO_2$ and a mixture of $WO_3$ and $SiO_2$ for increasing radiation intensity; and the ratio between exciting currents for red and green emitting phosphor materials $I_R/I_G$, and that between exciting currents for red and blue emitting phosphor materials $I_R/I_B$, for obtaining white color at about 9,300° K. are established to be $1.2\pm0.3$ and $1.5\pm0.5$ respectively.

2. A color picture tube according to claim 1, wherein said acidic oxide material constitutes about 0.05–0.5% by weight of the covered phosphor particles.

3. A color picture tube according to claim 2, wherein the amount of a killer substance of Co, Fe or Ni contained in said blue emitting phosphor material is reduced to be smaller than $10^{-3}$ by percent weight for further increasing the radiation intensity.

4. A color picture tube according to claim 2, wherein the ratio between Zn and Cd amounts as to said green emitting phosphor material is set to 63:37 for further increasing the radiation intensity.

References Cited

UNITED STATES PATENTS

| | | | |
|---|---|---|---|
| 2,878,137 | 3/1959 | Butler et al. | 117—33.5X |
| 2,951,169 | 8/1960 | Faria et al. | 117—100UX |
| 3,097,103 | 7/1963 | Homer et al. | 252—301.3X |
| 3,147,226 | 9/1964 | Jönck | 252—301.3 |

ALFRED L. LEAVITT, Primary Examiner

W. F. CYRON, Assistant Examiner

U.S. Cl. X.R.

117—100